(12) United States Patent
Li

(10) Patent No.: US 7,808,914 B2
(45) Date of Patent: Oct. 5, 2010

(54) METHOD AND APPARATUS FOR REALIZING THE INTERWORKING OF OAM FUNCTION BETWEEN THE ETHERNET AND THE MPLS NETWORK

(75) Inventor: Xixiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 459 days.

(21) Appl. No.: 11/794,435

(22) PCT Filed: Aug. 30, 2006

(86) PCT No.: PCT/CN2006/002231

§ 371 (c)(1),
(2), (4) Date: Oct. 11, 2007

(87) PCT Pub. No.: WO2007/031002

PCT Pub. Date: Mar. 22, 2007

(65) Prior Publication Data

US 2008/0144657 A1    Jun. 19, 2008

(51) Int. Cl.
*G01R 31/08* (2006.01)
(52) U.S. Cl. .................................... 370/241.1; 370/467
(58) Field of Classification Search .............. 370/236.1, 370/236.2, 241.1, 401, 465, 466, 467
See application file for complete search history.

(56) References Cited

U.S. PATENT DOCUMENTS

| | | | |
|---|---|---|---|
| 2003/0112760 A1* | 6/2003 | Puppa et al. | 370/241.1 |
| 2004/0184407 A1* | 9/2004 | Pok et al. | 370/236 |
| 2004/0252717 A1 | 12/2004 | Solomon et al. | |
| 2007/0097857 A1* | 5/2007 | Zhai | 370/218 |

FOREIGN PATENT DOCUMENTS

| | | |
|---|---|---|
| CN | 1 604 545 | 4/2005 |
| EP | 1 388 979 A1 | 2/2004 |

OTHER PUBLICATIONS

Mohan, Dinesh, 802.3ag-connectivity fault managment, Nortel networks, Jul. 12, 2004—tututorial.*

(Continued)

*Primary Examiner*—Derrick W Ferris
*Assistant Examiner*—Peter Cheng
(74) *Attorney, Agent, or Firm*—Conley Rose, P.C.; Grant Rodolph

(57) ABSTRACT

An apparatus and a method for realizing OAM function interworking between an Ethernet network and an MPLS network in network communication field. The method meets the challenge in realizing OAM functions when MPLS serves as a bearer network to bear Ethernet services, provides processing modes for all kinds of OAM functions. Based on the Ethernet-MPLS service interworking function model defined in Y.1415, interworking of Ethernet OAM functions defined in Y.17 ethoam and MPLS OAM functions defined in Y.1711 on network layer is realized, ensuring an end-to-end OAM interworking mechanism between Ethernet and MPLS networks. Processing modes for all kinds of OAM functions on the basis of the Ethernet-MPLS service interworking model in Y.1415 are provided, implementing end-to-end OAM interworking and improving communication continuity and safety between the Ethernet network and the MPLS network.

16 Claims, 2 Drawing Sheets

OTHER PUBLICATIONS

Cavendish et al, OAM in MPLS networks, IEEE communication magazine, Oct. 2004, entire document.*

Chun et al, review on the OAM of BcN, IEEE communication magazine, Aug. 2006, entire document.*

Supplementary European Search Report mailed Jan. 28, 2009 from a corresponding European Application No. 06 77 5548.

Dini P. et al. "IP/MPLS OAM: Challenges and Directions A multi-technology, proactive, and autonomic management view" IP Operations and Management, 2004. Proceedings IEEE Workshop on Beijing, China Oct. 11-13, 2004, Piscataway, NJ, USA, IEEE, Oct. 11, 2004, pp. 1-8.

Aissaoui M. et al. "Service Convergence Using MPLS Multiservice Networks" IEEE Communications Magazine, IEEE Service Center, Piscataway, US, vol. 43, No. 6, Jun. 1, 2005, pp. 152-159.

International Search Report from corresponding International Application No. PCT/CN2006/002231, filed Aug. 30, 2006.

* cited by examiner

METHOD AND APPARATUS FOR REALIZING THE INTERWORKING OF OAM FUNCTION BETWEEN THE ETHERNET AND THE MPLS NETWORK

FIELD OF THE PRESENT INVENTION

The present invention relates to network communication technologies, and more particularly to an apparatus and a method for realizing Operation and Maintenance (OAM) function interworking between Ethernet and Multi-Protocol Label Switching (MPLS) network.

BACKGROUND OF THE PRESENT INVENTION

Presently, with the continuous improvements of the Ethernet technology in every aspect, Ethernet technology has been extended continuously from Local Area Networks (LANs) to Metropolitan Area Networks (MANs) and backbone telecommunication networks. In the next-generation Ethernet services which are demanded increasingly, Multi-Protocol Label Switching (MPLS) has become the preferred network technology thanks to its unique advantages. A framework definition of Ethernet-MPLS service interworking model is provided in International Telecommunication Union -Telecommunication standardization sector (ITU-T) Y.1415.

ITU-T Y.1415 Ethernet-MPLS Networking—User Plane Interworking has proposed an Ethernet-MPLS service interworking model as shown in FIG. 1. In the service interworking model, the encapsulation of Ethernet services running in MPLS is provided in detail, In addition, the Pseudo Wire Emulation Edge to Edge (PWE3) workgroup of the Internet Engineering Task Force (IETF) has specialized an Ethernet-MPLS interworking application draft (draft-ietf-pwe3-Ethernet-encap-09.txt).

However, at present, there is no complete solution for OAM function interworking between Ethernet and MPLS. Therefore, it is an urgent task to realize an end-to-end OAM between MPLS and Ethernet.

SUMMARY OF THE PRESENT INVENTION

The present invention tends to provide an apparatus and a method for realizing Operation and Maintenance (OAM) function interworking between an Ethernet network and a Multi-Protocol Label Switching (MPLS) network, which meets the challenge in realizing OAM functions when MPLS serves as a bearer network to bear Ethernet services, realize OAM function interworking in the Ethernet-MPLS services interworking model, and ensure an end-to-end OAM realizing mechanism for Ethernet and MPLS network interworking, i.e., end-to-end OAM functions of Ethernet maintenance entities.

The present invention provides a method for realizing OAM function interworking between Ethernet and MPLS networks, wherein when it is required to convert Ethernet OAM functions into MPLS OAM functions, the method may include:

determining whether the Ethernet OAM functions affect the MPLS OAM functions; if yes, executing the next step; otherwise transferring Ethernet OAM frames in an MPLS network transparently and terminating the present process;

converting, by a first interworking function entity between a first Ethernet network and the MPLS network, the Ethernet OAM frames into corresponding types of MPLS OAM packets, and processing the MPLS OAM packets according to processing modes of the MPLS network for the corresponding types of MPLS OAM packets, and restoring, by a second interworking function entity between a second Ethernet network and the MPLS network, the MPLS OAM packets into the Ethernet OAM frames.

The Ethernet OAM frames may be Ethernet Continuity Check (ETH-CC) frames, and the converting the Ethernet OAM frames into corresponding types of MPLS OAM packets, processing the MPLS OAM packets and restoring the MPLS OAM packets into the Ethernet OAM frames may include:

converting, by the first interworking function entity, the ETH-CC frames into Label Switch Path (LSP) Connectivity Verification (CV) OAM packets, processing the LSP CV OAM packets according to an MPLS LSP CV function in the MPLS network, and converting, by the second interworking function entity, the LSP CV OAM packets into the Ethernet ETH-CC frames.

The Ethernet OAM frames may be Ethernet Loopback (ETH-LB) frames, and the converting the Ethernet OAM frames into corresponding types of MPLS OAM packets, processing the MPLS OAM packets and restoring the MPLS OAM packets into the Ethernet OAM frames may include:

converting, by the first interworking function entity, the ETH-LB frames into MPLS LSP LB OAM packets, processing the MPLS LSP LB OAM packets according to LSP LB function in the MPLS network, and converting, by the second interworking function entity, the LSP LB OAM packets into the Ethernet ETH-LB frames.

The Ethernet OAM frames may be Ethernet Link Trace (ETH-LT) frames, and the converting the Ethernet OAM frames into corresponding types of MPLS OAM packets, processing the MPLS OAM packets and restoring the MPLS OAM packets into the Ethernet OAM frames may include:

converting, by the first interworking function entity, the ETH-LT frames into MPLS LSP Path Trace OAM packets, processing the MPLS LSP Path Trace OAM packets according to LSP Path Trace function in the MPLS network, and converting, by the second interworking function entity, the LSP Path Trace OAM packets into the Ethernet ETH-LT frames.

The Ethernet OAM frames may be Ethernet Loss Measurement (ETH-LM) frames, and the converting the Ethernet OAM frames into corresponding types of MPLS OAM packets, processing the MPLS OAM packets and restoring the MPLS OAM packets into the Ethernet OAM frames may include:

converting, by the first interworking function entity, the ETH-LM frames into MPLS LSP LM OAM packets, processing the MPLS LSP LM OAM packets according to LSP LM function in the MPLS network, and converting, by the second interworking function entity, the LSP LM OAM packets into the Ethernet ETH-LM frames.

The Ethernet OAM frame may be an Ethernet Delay Measurement (ETH-DM) frame, and the converting the Ethernet OAM frames into corresponding types of MPLS OAM packets, processing the MPLS OAM packets and restoring the MPLS OAM packets into the Ethernet OAM frames may include:

converting, by the first interworking function entity, the ETH-DM frames into MPLS LSP DM OAM packets, processing the MPLS LSP DM OAM packets according to LSP DM function in the MPLS network, and converting, by the second interworking function entity, the LSP DM OAM packets into the Ethernet ETH-DM frames.

Between the determining whether the Ethernet OAM functions affect the MPLS OAM functions and the converting the Ethernet OAM frames into corresponding types of MPLS OAM packets, the method may further include:

choosing Ethernet OAM functions to be terminated, and terminating frames corresponding to the chosen OAM functions at the first interworking function entity.

The method may further include:

generating, by an OAM maintenance entity on a service layer in the first Ethernet network, an alarm, and driving, by the alarm, an OAM maintenance entity on a client layer corresponding to the service layer to generate an alarm;

encapsulating the alarm generated by OAM maintenance entity on the client layer in form of OAM packet at the first interworking function entity, and transferring the OAM packet transparently through the MPLS network to the second interworking function entity;

restoring the encapsulated OAM packet into the Ethernet OAM frame at the second interworking function entity, and transferring the Ethernet OAM frame to an opposite end.

The first interworking function entity may be an upstream function interworking entity, and the second interworking function entity may be a downstream function interworking entity.

The first interworking function entity may be a downstream function interworking entity, and the second interworking function entity may be an upstream function interworking entity.

Another embodiment of the present invention provides a method for realizing Operation and Maintenance (OAM) function interworking between Ethernet and MPLS networks. When it is required to convert MPLS OAM functions into Ethernet OAM functions, the method may include:

determining whether the MPLS OAM functions affect the Ethernet OAM functions; if yes, executing the next step; otherwise terminating MPLS OAM frames at an interworking function entity between an Ethernet network and an MPLS network and terminating the present process;

converting, by the interworking function entity between the Ethernet network and the MPLS network, the MPLS OAM frames into corresponding types of Ethernet OAM frames, and processing the Ethernet OAM frames according to processing modes of the Ethernet network for the corresponding types of MPLS OAM packets.

The MPLS OAM frames may be LSP Connectivity Verification (LSP-CV) frames, and the converting the MPLS OAM frames into corresponding types of Ethernet OAM frames and processing the Ethernet OAM frames may include:

converting, by the interworking function entity, the LSP-CV frames into Ethernet Ethernet Continuity Check (ETH-CC) OAM frames corresponding to an LSP on which the MPLS OAM frames are carried, and processing the ETH-CC OAM frames according to ETH-CC function in End Ethernet Network.

The MPLS OAM frames may be LSP Path Trace (LSP-PT) frames, and the converting the MPLS OAM frames into corresponding types of Ethernet OAM frames and processing the Ethernet OAM frames may include:

converting, by the interworking function entity, the LSP-PT frames into Ethernet Ethernet Link Trace (ETH-LT) OAM frames corresponding to an LSP on which the MPLS OAM frames are carried, and processing the ETH-LT OAM frames according to ETH-LT function in End Ethernet Network.

The interworking function entity may be an upstream function interworking entity or a downstream function interworking entity.

Another embodiment of the present invention provides an apparatus for realizing OAM function interworking between an Ethernet network and an MPLS network. The apparatus may include:

an OAM interworking function module, used to perform at least one of converting Ethernet OAM frames into corresponding types of MPLS OAM packets and transfer the MPLS OAM packets in the MPLS network or restoring the received MPLS OAM packets into the Ethernet OAM frames, when it is determined that Ethernet OAM functions affect MPLS OAM functions;

an Ethernet OAM function module inworking with the OAM interworking function module for processing the Ethernet OAM functions;

an MPLS OAM function module interworking with the OAM interworking function module for processing the MPLS OAM functions.

The Ethernet OAM function module may be used to accomplish at least one of insertion, extraction or modification of OAM messages including at least Ethernet Continuity Check (ETH-CC), Ethernet Loopback (ETH-LB) and Ethernet Link Trace (ETH-LT) messages in the Ethernet network.

The Ethernet OAM function module may be integrated in an Ethernet service processing module.

The MPLS OAM function module may be used to accomplish at least one of insertion, extraction or modification of OAM messages including at least Connectivity Verification (CV), Loopback (LB) and Path Trace (PT) messages.

The MPLS OAM function module may be integrated in an MPLS service processing module.

Another embodiment of the present invention provides an apparatus for realizing OAM function interworking between an Ethernet network and an MPLS network. The apparatus may include:

an OAM interworking function module, used to convert MPLS OAM frames into corresponding types of Ethernet OAM frames and transfer the Ethernet OAM frames in the Ethernet network when it is determined that MPLS OAM functions affect Ethernet OAM functions.

an Ethernet OAM function module interworking with the OAM interworking function module for processing the Ethernet OAM functions;

an MPLS OAM function module interworking with the OAM interworking function module for processing the MPLS OAM functions.

The Ethernet OAM function module may be used to accomplish at least one of insertion, extraction or modification of OAM messages including at least Ethernet Continuity Check (ETH-CC), Ethernet Loopback (ETH-LB) and Ethernet Link Trace (ETH-LT) messages in the Ethernet network.

The Ethernet OAM function module may be integrated in an Ethernet service processing module.

The MPLS OAM function module may be used to accomplish at least one of insertion, extraction or modification of OAM messages including at least Connectivity Verification (CV), Loopback (LB) and Path Trace (PT) messages.

The MPLS OAM function module may be integrated in an MPLS service processing module.

It can be seen from the above technical solutions provided by the embodiments of the present invention, the embodiments of the present invention provide processing modes for all kinds of OAM functions on the basis of the Ethernet-MPLS service interworking model in Y.1415, and thereby implement the end-to-end OAM interworking and improve the communication continuity and safety between the Ethernet network and the MPLS network.

DETAILED DESCRIPTION OF THE EMBODIMENTS

The key of he present invention is to provide an apparatus and a method for realizing OAM function interworking between Ethernet and MPLS networks, which meets the challenge in realizing OAM functions when MPLS serves as a bearer network to bear Ethernet services, and provides processing modes for various OAM functions. The embodiments of the present invention realize OAM function interworking on the basis of the Ethernet-MPLS services interworking model defined in Y.1415, and ensure an end-to-end OAM realizing mechanism for Ethernet and MPLS network interworking, i.e., end-to-end OAM functions of Ethernet maintenance entities.

Usually an End Ethernet is an access and converge network with OAM maintenance entities arranged on layers 1 to 4; after the Ethernet maintenance entities on different layers are arranged, the maintenance entities will exist in a nested relationship, that is, maintenance entities in lower-layer cover maintenance entities in higher-layer.

An embodiment of the present invention provides a method for realizing OAM function interworking between an Ethernet network and an MPLS network. In the embodiment, the method is described with the following OAM functions as examples: Ethernet Continuity Check (ETH-CC), Ethernet Loopback (ETH-LB), Ethernet Link Trace (ETH-LT), Ethernet Loopback State (ETH-LS), Ethernet Auto Protection Switching (ETH-APS), Ethernet Loss Measurement (ETH-LM), Ethernet Delay Measurement (ETH-DM) and Ethernet Ack Signal (ETH-AS). The process for realizing interworking of the above OAM functions includes the following two cases:

(1) conversion of upstream/downstream Ethernet OAM functions into MPLS OAM functions;

(2) conversion of MPLS OAM functions into upstream/downstream Ethernet OAM functions.

Figure 1:
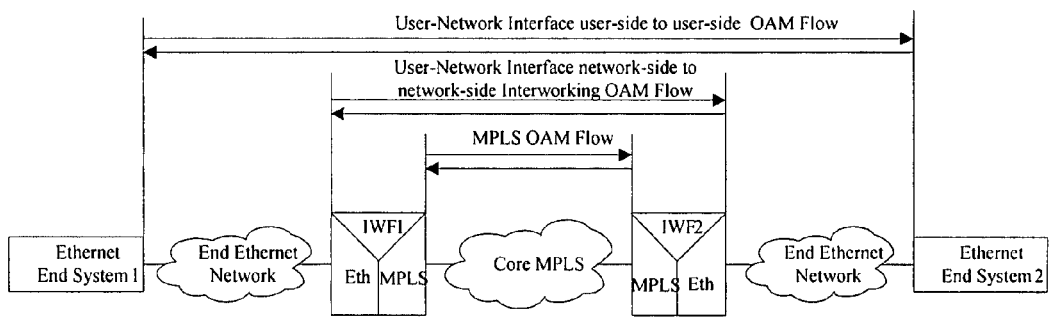
FIG. 1 is a schematic diagram illustrating a model of OAM interworking between Ethernet and MPLS networks in the prior art.

The encapsulation/decapsulation of OAM messages described in this embodiment follows the encapsulation/decapsulation procedures specified in Y.1415. As shown in FIG. 1, in the direction from Ethernet End System 1 to Ethernet End System 2, Ethernet OAM messages are encapsulated at Inter-working Function (IWF) 1 into MPLS messages according to the specification in Y.1415 and transferred in an MPLS network, and then the Ethernet OAM messages are decapsulated at IWF2 and transferred to Ethernet End System 2. In the direction from Ethernet End System 2 to Ethernet End System 1, the encapsulation/decapsulation procedures are symmetric to the above described procedures. The Ethernet OAM functions are transferred in frame. Hereunder, the method provided in the embodiment of the present invention will be described in detail with reference to FIG. 1.

Figure 2:
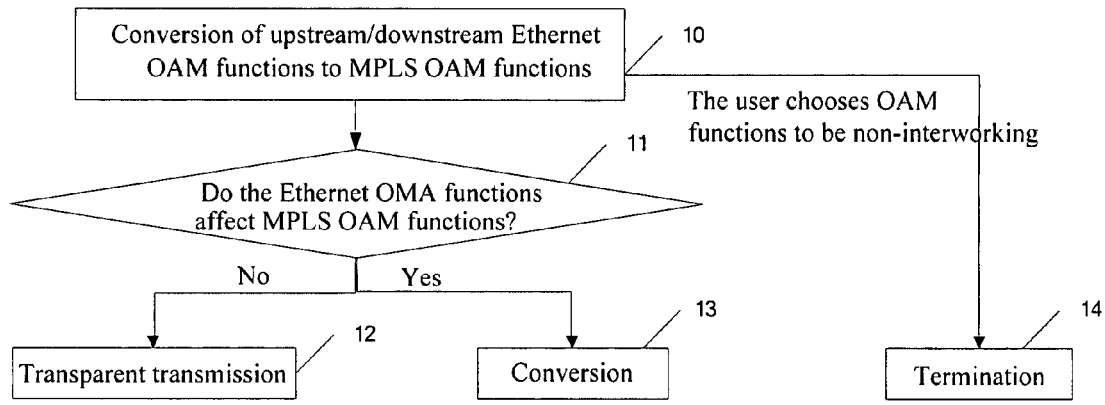
FIG. 2 is flow chart 1 of a method provided according to an embodiment in the present invention.

In the first case, i.e., conversion of upstream/downstream Ethernet OAM functions into MPLS OAM functions, as shown in FIG. 2, the method includes the following steps.

In Step 10, the conversion of upstream/downstream Ethernet OAM functions into MPLS OAM functions is processed.

In Step 11, it is determined whether the OAM functions in the Ethernet network affect OAM functions in the MPLS network.

In Step 12, if it is determined that the OAM functions in the Ethernet network do not affect the OAM functions in the MPLS network, a transparent transmission processing mode is employed.

The Ethernet OAM messages are encapsulated/decapsulated through IWF1/IWF2 in user packet, and transferred transparently in the MPLS network, that is, the Ethernet OAM functions are transferred transparently in the MPLS network. Only the Ethernet OAM functions from Ethernet End System 1 to Ethernet End System 2 are described herein, and the OAM functions in the reverse direction are processed in a reverse sequence, i.e., encapsulated by IWF2 and decapsulated by IWF1. The OAM functions are processed as follows:

ETH-CC: the Ethernet OAM messages are encapsulated in user packet at IWF1, transferred transparently in the MPLS network, and decapsulated into Ethernet OAM ETH-CC frames at IWF2;

ETH-LB: the Ethernet OAM messages are encapsulated in user packet when passing through IWF1, transferred transparently in the MPLS network, and decapsulated into Ethernet OAM ETH-LB frames at IWF2;

ETH-LS: the Ethernet OAM messages are encapsulated in user packet when passing through IWF1, transferred transparently in the MPLS network, and decapsulated into Ethernet OAM ETH-LS frames at IWF2;

ETH-LT: the Ethernet OAM messages are encapsulated in user packet when passing through IWF1, transferred transparently in the MPLS network, and decapsulated into Ethernet OAM ETH-LT frames at IWF2;

ETH-APS: the Ethernet OAM messages are encapsulated in user packet when passing through IWF1, transferred transparently in the MPLS network, and decapsulated into Ethernet OAM ETH-APS frames at IWF2;

ETH-LM: the Ethernet OAM messages are encapsulated in user packet when passing through IWF1, transferred transparently in the MPLS network, and, in conjunction with a statistics on packet loss in the MPLS network, decapsulated into Ethernet OAM ETH-LM frames at IWF2;

ETH-DM: the Ethernet OAM messages are encapsulated in user packet when passing through IWF1, transferred transparently in the MPLS network, and decapsulated into Ethernet OAM ETH-DM frames at IWF2;

ETH-AS: the Ethernet OAM messages are encapsulated in user packet when passing through IWF1, transferred transparently in the MPLS network, and decapsulated into Ethernet OAM ETH-AS frames at IWF2.

Multiple Ethernet OAM maintenance entities existing in a nested form form a relationship of client layer and service layer, and alarms resulted from failures on the service layer will drive the client layer. Due to the fact that there are Ethernet maintenance entities arranged on different layers, and because there is a termination point of higher-layer maintenance entity group at IWF1, failures will be detected at IWF1 during the operation of OAM functions and alarms will be generated; the alarms generated in higher-layer maintenance entities serving as service layers for lower-layer maintenance entities will drive the lower-layer maintenance entities to generate ETH-AIS alarm indications.

For example, ETH-CC loss or abnormality will cause a dLOC (CC loss) alarm, a dMismerger (CC is sent to a wrong object) alarm, or a dUnexpected (CC is not correct) alarm. Those alarms are reported to a network management system from IWF1, and cause a dServer (service layer defect) alarm at IWF1 to intermediate maintenance points of lower-layer maintenance entities. The dServer alarm is further converted into an ETH-AIS alarm which is encapsulated at IWF1 in form of OAM packet; and the ETH-AIS alarm is transferred transparently in the MPLS network, restored at IWF2 into an Ethernet OAM frame and transferred to the opposite end. The above process is an inter-layer driving process in the case of nested Ethernet OAM maintenance entities.

In Step 13, if it is determined in step 11 that the OAM functions in the Ethernet network affect the OAM functions in the MPLS network, a conversion processing mode is employed.

The conversion processing mode refers to that OAM frames in the Ethernet network are converted through IWF1 or IWF2 into corresponding OAM packets in the MPLS network, that is, the OAM functions in the Ethernet network are converted into the OAM functions in the MPLS network. Only the Ethernet OAM frames from Ethernet End System 1 to Ethernet End System 2 are described herein, and the OAM frames in reverse direction are processed in a reverse sequence, i.e., converted by IWF2 and restored by IWF1. The OAM functions are processed as follows:

ETH-CC: the Ethernet OAM frames are converted into MPLS LSP CV packets corresponding to an Ethernet flow when passing through IWF1; the CV packets are processed according to LSP CV functions in the MPLS network; and the LSP CV packets are converted into Ethernet OAM ETH-CC frames through IWF2;

ETH-LB: the Ethernet OAM frames are converted into MPLS LSP LB packets corresponding to an Ethernet flow when passing through IWF1; the LB packets are processed according to LSP LB functions in the MPLS network; and the LSP LB packets are converted into Ethernet OAM ETH-LB frames through IWF2;

ETH-LS: the Ethernet OAM frames are processed in the same way as that in the transparent transmission mode;

ETH-LT: the Ethernet OAM frames are converted into MPLS LSP Path Trace OAM packets corresponding to an Ethernet flow when passing through IWF1; the Path Trace OAM packets are processed according to LSP Path Trace functions in the MPLS network; and the LSP Path Trace packets are converted into Ethernet OAM ETH-LT frames through IWF2;

ETH-APS: the Ethernet OAM frames are processed in the same way as that in the transparent transmission mode;

ETH-LM: the Ethernet OAM frames are converted into MPLS LSP LM packets corresponding to an Ethernet flow when passing through IWF1; the LM packets are processed according to LSP LM functions in the MPLS network; and the LSP LM packets are converted into Ethernet OAM ETH-LM frames through IWF2;

ETH-DM: the Ethernet OAM frames are converted into MPLS LSP DM packets corresponding to an Ethernet flow when passing through IWF1; the DM packets are processed according to LSP DM functions in the MPLS network; and the LSP DM packets are converted into Ethernet OAM ETH-DM frames through IWF2;

ETH-AS: the Ethernet OAM frames are processed in the same way as that in the transparent transmission mode.

In Step 14, according to the user's choice, it may be configured that some OAM functions are processed in a termination mode when the user requires those OAM functions not to interwork.

In the termination mode, Ethernet OAM frames are terminated at IWF1 or terminated at IWF2 in a reverse direction; the Ethernet OAM functions from Ethernet End System 1 to Ethernet End System 2 are terminated at IWF1, and the OAM functions in a reverse direction are terminated at IWF2; alarms generated by the OAM functions do not affect the MPLS network or be transferred to the opposite Ethernet.

Figure 3:
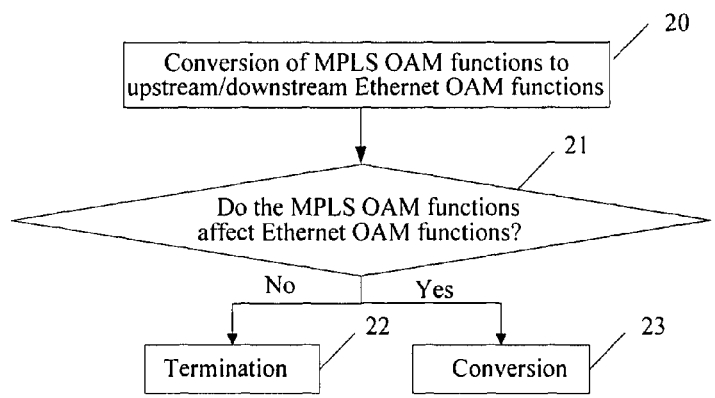
FIG. 3 is flow chart 2 of a method provided according to an embodiment in the present invention.

In the second case, i.e., the case of conversion of MPLS OAM functions to upstream/downstream Ethernet OAM functions, as shown in FIG. 3, the method includes the steps as follows.

In Step 20, the conversion of MPLS OAM functions into upstream/downstream Ethernet OAM function is processed.

In Step 21, it is determined whether the OAM functions in the MPLS network affect the OAM functions in the Ethernet network.

In Step 22, if it is determined that the OAM functions in the MPLS network do not affect the OAM functions in the Ethernet network, a termination processing mode is employed.

In the termination mode, MPLS OAM frames are terminated at IWF1 or IWF2. Only MPLS OAM frames from MPLS to End Ethernet Network 2 are described herein, and OAM frames in a reverse direction are terminated at IWF1. The MPLS OAM functions are processed as follows:

LSP Connectivity Verification (LSP-CV): the MPLS OAM frames are terminated when passing through IWF2, without affecting End Ethernet Network 2;

LSP Fast Failure Detection (LSP-FFD): the MPLS OAM frames are terminated when passing through IWF2, without affecting End Ethernet Network 2;

LSP Path Trace (LSP-PT): the MPLS OAM frames are terminated when passing through IWF2, without affecting End Ethernet Network 2;

LSP Auto Protection Switching (LSP-APS): the MPLS OAM frames are terminated when passing through IWF2, without affecting End Ethernet Network 2;

In Step 23, if it is determined that the OAM functions in the MPLS network affect the OAM function in the Ethernet network, a conversion processing mode is employed.

In the conversion processing mode, MPLS OAM frames are converted into corresponding Ethernet OAM frames when passing through IWF1 or IWF2. Only the MPLS OAM frames from MPLS to End Ethernet Network 2 are described herein, and the OAM frames in reverse direction are converted or terminated by IWF1. The MPLS OAM functions are processed as follows:

LSP-CV: the MPLS OAM frames are converted into Ethernet ETH-CC OAM frames corresponding to the LSP on which the MPLS OAM frames are carried when passing through IWF2, and the ETH-CC OAM frames are processed according to the ETH-CC function in End Ethernet Network 2;

LSP-FFD: the MPLS OAM frames are processed in the same way as that in the termination mode;

LSP-PT: the MPLS OAM frames are converted into Ethernet ETH-LT OAM frames corresponding to the LSP on which the MPLS OAM frames are carried when passing through IWF2, and the ETH-LT OAM frames are processed according to the ETH-LT function in End Ethernet Network 2;

LSP-APS: the MPLS OAM frames are processed in the same way as that in the termination mode.

Another embodiment of the present invention provides an apparatus for realizing OAM function interworking between Ethernet and MPLS networks. The apparatus is described hereunder in detail in conjunction with FIG. 4.

Figure 4:
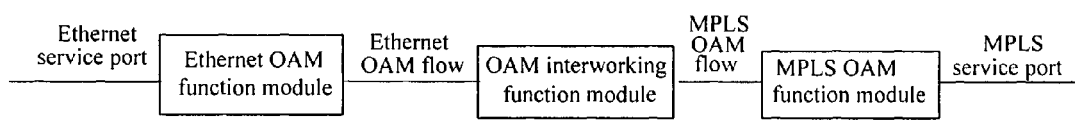
FIG. 4 is a block diagram of an apparatus provided according to an embodiment in the present invention.

As shown in FIG. 4, the apparatus includes an Ethernet OAM function module, an MPLS OAM function module and an OAM interworking function module. The Ethernet OAM function module and the MPLS OAM function module have an Ethernet service port and an MPLS service port respectively, for sending and receiving OAM messages. The functions of the modules of the apparatus are described hereunder through an example of converting OAM functions in an Ethernet network into OAM functions in an MPLS network.

The OAM interworking function module is used to perform at least one of converting the OAM frames in the Ethernet network into corresponding types of OAM packets in the MPLS network and transfer the OAM packets in the MPLS or restoring received OAM packets in the MPLS network into OAM frames in an Ethernet network, when it is determined that the Ethernet OAM functions affect the MPLS OAM functions.

The Ethernet OAM function module interworks with the OAM interworking function module, and is used to process Ethernet OAM functions.

The MPLS OAM function module interworks with the OAM interworking function module, and is used to process MPLS OAM functions.

When it is required to convert MPLS OAM functions into Ethernet OAM functions, the functions of the Ethernet OAM function module and the MPLS OAM function module are the same as those described above, except for the difference as follows.

The OAM interworking function module is used to convert the OAM frames in the MPLS network into corresponding types of OAM frames in an Ethernet network and transfer the Ethernet OAM frames in the Ethernet network when it is determined that the MPLS OAM functions affect the Ethernet OAM functions.

The above Ethernet OAM function module can be specifically used in accomplishing at least one of insertion, extraction or modification of ETH-CC, ETH-LB and ETH-LT OAM messages. The Ethernet OAM function module can be integrated in an Ethernet service processing module.

The MPLS OAM function module can be specifically used in accomplishing at least one of insertion, extraction or modification of MPLS CV OAM messages, MPLS LB OAM messages and MPLS PT OAM messages. The MPLS OAM function module can be integrated in an MPLS service processing module.

It can be seen that the above OAM interworking function module realizes an OAM function interworking between Ethernet and MPLS networks. It can choose different transmission modes for OAM maintenance entities on different layers, thereby accomplishing interworking between Ethernet OAM functions and MPLS OAM functions and realizing end-to-end OAM functions for Ethernet maintenance entities.

In conclusion, embodiments of the present invention realize interworking of OAM functions and end-to-end OAM mechanism on the basis of the Ethernet-MPLS interworking model defined in Y.1415.

The embodiments described above are preferred embodiments of the present invention, and the protect scope of the present invention should not be limited to those embodiments. It should be understood for those skilled in the art that modifications and alterations can be made to the invention without departing from the spirit and scope of the invention; however, any of such modifications or alterations shall fall into the protected domain of the invention defined by the accompanied claims.

What is claimed is:

1. A method for realizing Operation and Maintenance (OAM) function interworking between Ethernet and Multi-Protocol Label Switching (MPLS) networks, wherein when it is required to convert Ethernet OAM functions into MPLS OAM functions, the method comprises:
   determining whether the Ethernet OAM functions affect the MPLS OAM functions; if yes, executing the next step; otherwise transferring Ethernet OAM frames in an MPLS network transparently and terminating the present process; and
   converting, by a first interworking function entity between a first Ethernet network and the MPLS network, the Ethernet OAM frames into corresponding types of MPLS OAM packets, processing the MPLS OAM packets according to processing modes of the MPLS network for the corresponding types of MPLS OAM packets, and restoring, by a second interworking function entity between a second Ethernet network and the MPLS network, the MPLS OAM packets into the Ethernet OAM frames,
   wherein the Ethernet OAM frames are Ethernet Link Trace (ETH-LT) frames, and
   wherein converting the Ethernet OAM frames into corresponding types of MPLS OAM packets, processing the MPLS OAM packets and restoring the MPLS OAM packets into the Ethernet OAM frames comprises: converting, by the first interworking function entity, the ETH-LT frames into MPLS LSP Path Trace OAM packets, processing the MPLS LSP Path Trace OAM packets according to LSP Path Trace function in the MPLS network, and converting, by the second interworking function entity, the LSP Path Trace OAM packets into the Ethernet ETH-LT frames.

2. The method according to claim 1, wherein between the determining whether the Ethernet OAM functions affect the MPLS OAM functions and the converting the Ethernet OAM frames into corresponding types of MPLS OAM packets, the method further comprises:
   choosing Ethernet OAM functions to be terminated, and terminating frames corresponding to the chosen OAM functions at the first interworking function entity.

3. The method according to claim 1, wherein the method further comprises:
   generating, by an OAM maintenance entity on a service layer in the first Ethernet network, an alarm, and driving, by the alarm, an OAM maintenance entity on a client layer corresponding to the service layer to generate an alarm;
   encapsulating the alarm generated by OAM maintenance entity on the client layer in form of OAM packet at the first interworking function entity, and transferring the OAM packet transparently through the MPLS network to the second interworking function entity; and
   restoring the encapsulated OAM packet into the Ethernet OAM frame at the second interworking function entity, and transferring the Ethernet OAM frame to an opposite end.

4. The method according to claim 1, wherein the first interworking function entity is an upstream function interworking entity, and wherein the second interworking function entity is a downstream function interworking entity.

5. The method according to claim 1, wherein the first interworking function entity is a downstream function interworking entity, and wherein the second interworking function entity is an upstream function interworking entity.

6. A method for realizing Operation and Maintenance (OAM) function interworking between Ethernet and Multi-Protocol Label Switching (MPLS) networks, wherein when it is required to convert Ethernet OAM functions into MPLS OAM functions, the method comprises:

determining whether the Ethernet OAM functions affect the MPLS OAM functions; if yes, executing the next step; otherwise transferring Ethernet OAM frames in an MPLS network transparently and terminating the present process; and converting, by a first interworking function entity between a first Ethernet network and the MPLS network, the Ethernet OAM frames into corresponding types of MPLS OAM packets, processing the MPLS OAM packets according to processing modes of the MPLS network for the corresponding types of MPLS OAM packets, and restoring, by a second interworking function entity between a second Ethernet network and the MPLS network, the MPLS OAM packets into the Ethernet OAM frames, wherein the Ethernet OAM frames are Ethernet Loss Measurement (ETH-LM) frames, and wherein converting the Ethernet OAM frames into corresponding types of MPLS OAM packets, processing the MPLS OAM packets and restoring the MPLS OAM packets into the Ethernet OAM frames comprises: converting, by the first interworking function entity, the ETH-LM frames into MPLS LSP LM OAM packets, processing the MPLS LSP LM OAM packets according to LSP LM function in the MPLS network, and converting, by the second interworking function entity, the LSP LM OAM packets into the Ethernet ETH-LM frames.

7. The method according to claim 6, wherein between the determining whether the Ethernet OAM functions affect the MPLS OAM functions and the converting the Ethernet OAM frames into corresponding types of MPLS OAM packets, the method further comprises:

choosing Ethernet OAM functions to be terminated, and terminating frames corresponding to the chosen OAM functions at the first interworking function entity.

8. The method according to claim 6, wherein the method further comprises:

generating, by an OAM maintenance entity on a service layer in the first Ethernet network, an alarm, and driving, by the alarm, an OAM maintenance entity on a client layer corresponding to the service layer to generate an alarm;

encapsulating the alarm generated by OAM maintenance entity on the client layer in form of OAM packet at the first interworking function entity, and transferring the OAM packet transparently through the MPLS network to the second interworking function entity; and restoring the encapsulated OAM packet into the Ethernet OAM frame at the second interworking function entity, and transferring the Ethernet OAM frame to an opposite end.

9. The method according to claim 6, wherein the first interworking function entity is an upstream function interworking entity, and wherein the second interworking function entity is a downstream function interworking entity.

10. The method according to claim 6, wherein the first interworking function entity is a downstream function interworking entity, and wherein the second interworking function entity is an upstream function interworking entity.

11. A method for realizing Operation and Maintenance (OAM) function interworking between Ethernet and Multi-Protocol Label Switching (MPLS) networks, wherein when it is required to convert Ethernet OAM functions into MPLS OAM functions, the method comprises:

determining whether the Ethernet OAM functions affect the MPLS OAM functions; if yes, executing the next step; otherwise transferring Ethernet OAM frames in an MPLS network transparently and terminating the present process; and converting, by a first interworking function entity between a first Ethernet network and the MPLS network, the Ethernet OAM frames into corresponding types of MPLS OAM packets, processing the MPLS OAM packets according to processing modes of the MPLS network for the corresponding types of MPLS OAM packets, and restoring, by a second interworking function entity between a second Ethernet network and the MPLS network, the MPLS OAM packets into the Ethernet OAM frames, wherein the Ethernet OAM frame is an Ethernet Delay Measurement (ETH-DM) frame, and wherein converting the Ethernet OAM frames into corresponding types of MPLS OAM packets, processing the MPLS OAM packets and restoring the MPLS OAM packets into the Ethernet OAM frames comprises: converting, by the first interworking function entity, the ETH-DM frames into MPLS LSP DM OAM packets, processing the MPLS LSP DM OAM packets according to LSP DM function in the MPLS network, and converting, by the second interworking function entity, the LSP DM OAM packets into the Ethernet ETH-DM frames.

12. The method according to claim 11, wherein between the determining whether the Ethernet OAM functions affect the MPLS OAM functions and the converting the Ethernet OAM frames into corresponding types of MPLS OAM packets, the method further comprises: choosing Ethernet OAM functions to be terminated, and terminating frames corresponding to the chosen OAM functions at the first interworking function entity.

13. The method according to claim 11, wherein the method further comprises:

generating, by an OAM maintenance entity on a service layer in the first Ethernet network, an alarm, and driving, by the alarm, an OAM maintenance entity on a client layer corresponding to the service layer to generate an alarm;

encapsulating the alarm generated by OAM maintenance entity on the client layer in form of OAM packet at the first interworking function entity, and transferring the OAM packet transparently through the MPLS network to the second interworking function entity; and restoring the encapsulated OAM packet into the Ethernet OAM frame at the second interworking function entity, and transferring the Ethernet OAM frame to an opposite end.

14. The method according to claim 11, wherein the first interworking function entity is an upstream function interworking entity, and wherein the second interworking function entity is a downstream function interworking entity.

15. The method according to claim 11, wherein the first interworking function entity is a downstream function interworking entity, and wherein the second interworking function entity is an upstream function interworking entity.

16. A method for realizing Operation and Maintenance (OAM) function interworking between Ethernet and Multi-Protocol Label Switching (MPLS) networks, wherein when it is required to convert MPLS OAM functions into Ethernet OAM functions, the method comprises:

determining whether the MPLS OAM functions affect the Ethernet OAM functions; if yes, executing the next step; otherwise terminating MPLS OAM frames at an interworking function entity between an Ethernet network and an MPLS network and terminating the present process; and converting, by the interworking function entity between the Ethernet network and the MPLS network, the MPLS OAM frames into corresponding types of Ethernet OAM frames, and processing the Ethernet OAM frames according to processing modes of the Ethernet network for the corresponding types of Ethernet OAM packets, wherein the MPLS OAM frames are LSP Path Trace (LSP-PT) frames, and wherein converting the MPLS OAM frames into corresponding types of Ethernet OAM frames and processing the Ethernet OAM frames comprises: converting, by the interworking function entity, the LSP-PT frames into Ethernet Link Trace (ETH-LT) OAM frames corresponding to an LSP on which the MPLS OAM frames are carried, and processing the ETH-LT OAM frames according to ETH-LT function in an End Ethernet Network.

* * * * *